Aug. 19, 1969  B. R. BENITH  3,461,764
BLADE GUIDES FOR BAND SLICER
Filed Nov. 7, 1966  2 Sheets-Sheet 1

INVENTOR.
BENEDICT R. BENITH
BY *B H Fishkin*
ATTORNEY

INVENTOR.
BENEDICT R. BENITH

United States Patent Office 3,461,764
Patented Aug. 19, 1969

3,461,764
BLADE GUIDES FOR BAND SLICER
Benedict R. Benith, Richmond, Va., assignor to American Machine & Foundry Company, a corporation of New Jersey
Filed Nov. 7, 1966, Ser. No. 592,464
Int. Cl. B26d 1/46, 1/48, 1/54
U.S. Cl. 83—201.1
12 Claims

ABSTRACT OF THE DISCLOSURE

In a slicing machine having a plurality of band saws mounted around a set of drive rollers and a stationary blade guide assembly for each pass of the plurality of band saw blade passes, means for translating the attitude of the band saw blades comprising at least one shaft mounted on each side of the slicing work area, and a plurality of interconnected rotatable blade guides, one for each band saw blade pass.

---

This invention relates to high speed bread slicing machines which include a plurality of band saw type blades, and more particularly to an improvement in the band saw blade guiding means.

In bread slicing machines of this type, band saw blades are mounted between two sets of driven rollers, the band saws being mounted on the rollers with the flat part of the blades flush with the surface of the rollers. The drive rollers are then rotated at a rapid speed and articles to be sliced are advanced through the driven blades.

However, due to the orientation of the elements of the machine, it is necessary to translate the attitude of the band saw blades approximately 90° to present the cutting edges thereof in a convenient direction. In the past such translation has been effected by threading each pass of the band saw blade through a stationary blade guide assembly, which assembly included two spaced fork-shaped members, one on each side of the slicing work area.

The opening in the fork-shaped members received the band saw blade, and were oriented such that they twisted the blade approximately 90°, the blade, due to the twist therein, exerting a substantial force against one or both "tines" of the fork-shaped member.

Due to the nature of this arrangement and the high speed of the band saw blades, the friction developed between the band saw blade and the stationary blade guide members led to rapid wear and breakage of both the band saw blades and the stationary blade guide members.

It is, accordingly, an object of this invention to provide band saw blade guide means that develop substantially less frictional wear than those heretofore known in the art.

In accordance with the object the invention comprises, broadly speaking, mounting at least one shaft on each side of the machine between each set of stationary blade guides and a set of drive rollers, and rotatably mounting means on the shaft for engaging the band saw blades and translating the attitude thereof such that the cutting edges thereof are substantially parallel to the infeed direction of articles to be sliced.

Many other objects, advantages and features of this invention reside in the construction, combination and arrangement of parts involved in the embodiment of the invention described hereinbelow in connection with the accompanying drawings wherein.

A blade slicing machine having a plurality of band saw type blades and stationary blade guide assemblies therefor for use with which the structure of the present invention is primarily designed is described more fully in Patent No. 2,293,083 issued Aug. 18, 1942 to P. G. Schlemmer, Patent No. 2,375,231 issued May 8, 1945 to A. A. Kottman, and Patent No. 3,145,745 issued Aug. 25, 1964 to B. R. Benith.

Figure 1:
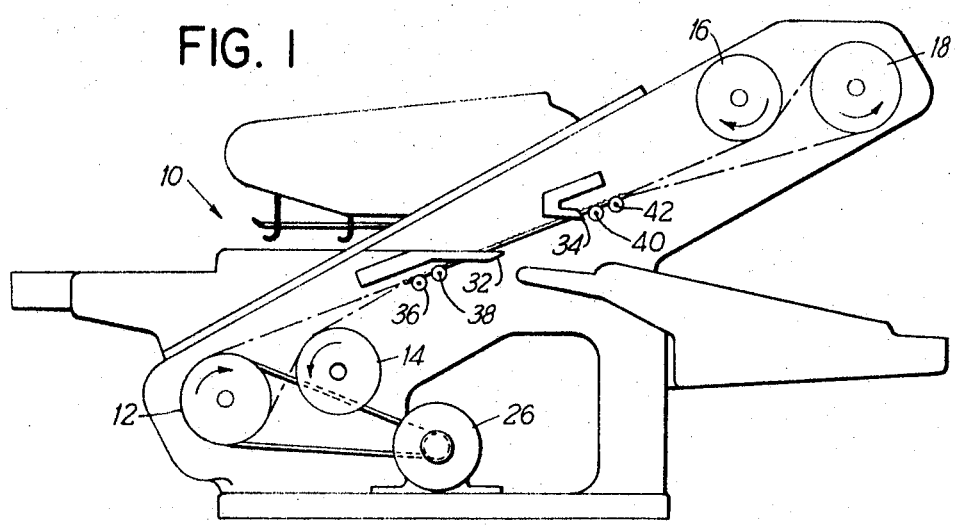
FIGURE 1 is an elevational view of a slicing machine showing the general arrangement of the elements thereof.
Figure 2:
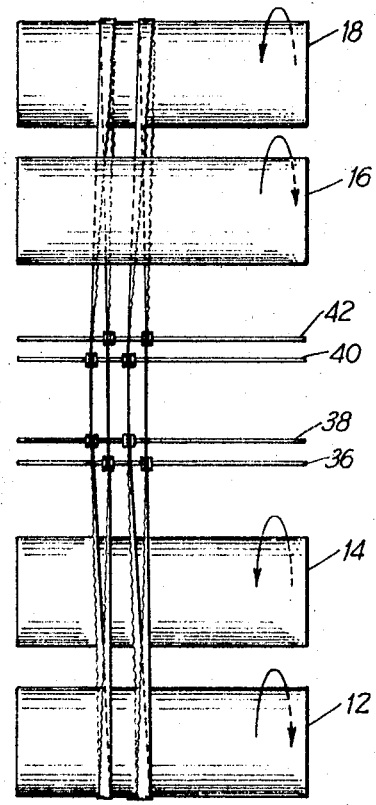
FIGURE 2 is a schematic showing of the blade guide units of the invention in combination with one band saw blade and the drive rollers therefor.

With reference to FIG. 1, a bread slicing machine 10 of the type described comprises a drive roller 12 and three idling rollers 14, 16, and 18 over which a plurality of band saw blades 20 are mounted. As is well known in the art, such an arrangement provides two passes 22 and 24 of each band saw blade for slicing. It will be appreciated that while only one band saw blade is shown in FIGS. 1 and 2 there are actually a large plurality of band saw blades mounted in a side by side fashion on rollers 12, 14, 16, and 18. The drive means for the rollers is provided by a motor 26 and suitable means 28 connecting it to drive roller 12.

Figure 3:
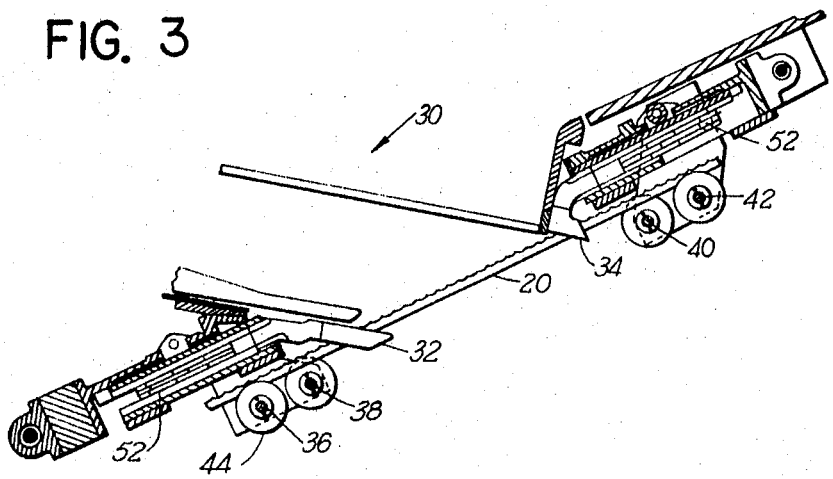
FIGURE 3 is a partial view showing a portion of a band saw blade, the stationary blade guide assembly therefor, and the blade guide means of the instant invention.

Referring now to FIG. 3, each pass of band saw blade 20 is fed through a stationary blade guide assembly indicated generally at 30. The stationary blade guide assembly includes two stationary blade guide members 32 and 34. The stationary blade guide assembly shown in FIG. 3 is substantially similar to that shown in the Benith patent referred to hereinabove and, although only one stationary blade guide assembly is shown in FIG. 3, it should be noted that there is a stationary blade guide assembly in the machine for each pass of a band saw blade.

As set forth above, it was previously the function of these stationary blade guide assemblies to translate the attitude of the band saw blades from the flat manner in which they are supported on the rollers to the on-edge manner in which they are operable to slice. This function is now assumed by the means of the instant invention.

With reference to FIGS. 2 through 5, the invention comprises four shafts 36, 38, 40, and 42 mounted in parallel spaced relationship with rollers 12, 14, 16, and 18. As shown in FIG. 1, shafts 36 and 38 are positioned between stationary blade guide 32 and rollers 12 and 14, while shafts 40 and 42 are positioned between stationary blade guide 34 and rollers 16 and 18.

Figure 5:
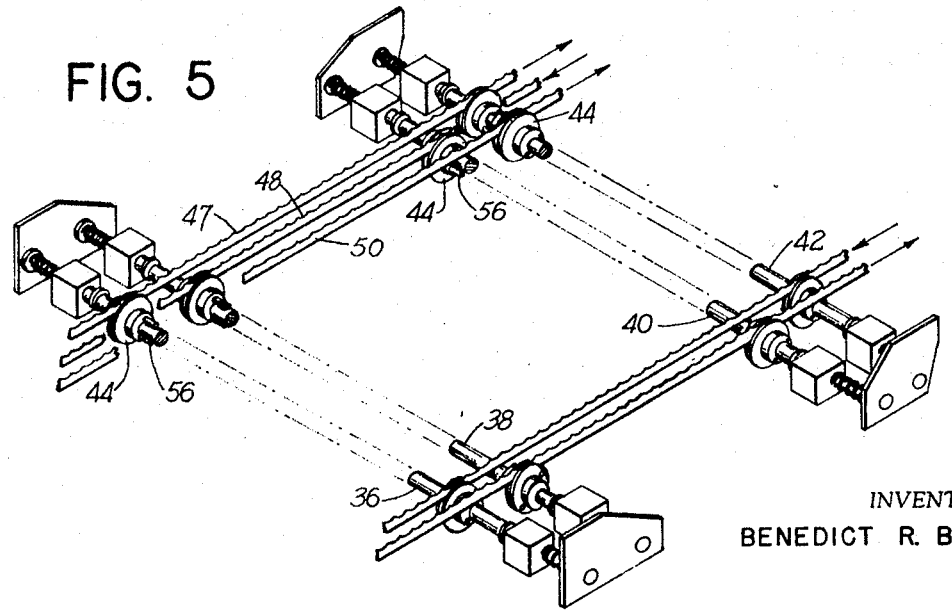
FIGURE 5 is a schematic showing of the blade guide units of the invention.

A plurality of annular blade guides 44 are rotatably and slidably mounted on each of the shafts 36, 38, 40 and 42 and include an annular recess 45 in the periphery thereof for receiving band saw blades therein. Each rotatable blade guide 44 includes a bearing surface 46. As seen in FIGS. 3 and 5, each pass of the band saw blades pass through the annular recess 45 in one rotatable blade guide 44 on each side of the slicing area. With this arrangement, the attitude of the band saw blades are translated by the rotatable members 44 prior to their passing through stationary blade guides 32 and 34, so that there is a substantial decrease in the friction developed between blade guides 32 and 34 and the band saw blades. Thus, the major portion of the frictional force developed in translating the attitude of the band saw blades is now developed between the band saw blades and the rotatable blade guides 44, saving the more expensive and more difficult to replace stationary assemblies 30. And, since blade guides 44 are rotatable on their shafts, they rotate in response to the frictional force applied thereto, and thus substantially reduce the wear to themselves caused by the friction force developed by the change in blade attitude.

The rotatable blade guides are mounted on four shafts, two on each side of the slicing work area, instead of two, for reasons discussed in detail below. As seen most clearly in FIG. 2, alternate band saw passes travel in opposite directions, and all the band saw passes traveling in the same direction pass through rotatable blade guides mounted one of the two shafts on each side of the slicing work area, while all the band saw passes traveling in the other direction pass through rotatable blade guides mounted on the other of the two shafts on each side of the slicing work area. For example, as seen in FIG. 5, band saw blades 47 and 48 are the passes of one band saw while band saw blade 50 is a pass of the band saw mounted on the drive rollers adjacent to the band saw of blades 47 and 48. And, band saw blade 47 passes through rotatable blade guides 44 mounted on shafts 36 and 42, while band saw blade 48 passes through blade guides 44 mounted on shafts 38 and 40.

Bread slicing machines of the type described are now generally provided with means to vary the spacing between adjacent band saw blades so as to vary the width of the slices provided thereby. For example, the apparatus shown and described in the Benith patent referred to hereinabove provides means for adjusting the spacing between the stationary blade guide assemblies disclosed therein. With reference to FIG. 3 of the drawings of this application, it will be noted that blade guide assembly 30 discloses in part, at 52 and 54, stationary blade guide structure similar to that shown in the Benith patent and it should be noted that the plurality of stationary blade guide assemblies of the structure herein described are interconnected by means for varying the space therebetween similar to that shown in said Benith patent.

Figure 4:
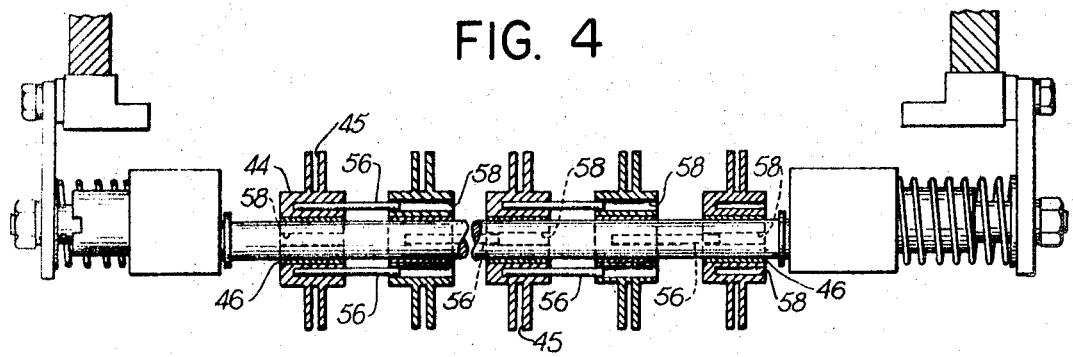
FIGURE 4 is a view of a shaft having the blade guide units of the instant invention mounted thereon.

With reference to FIG. 4, a plurality of rods 56 are mounted between the rotatable blade guide members 44 on each shaft 36, 38, 40, and 42, thus interconnecting all the rotatable blade guides 44 on each of the shafts. Each rod 56 is fixedly mounted in one blade guide and slidably received in recesses 58 provided in an adjacent blade guide 44. For space considerations, the sets of rods interconnecting adjacent rotatable guides 44 on each shaft are displaced 90° as shown in FIG. 4.

It is this interconnection that is the reason for providing four shafts for the rotatable blade guides, rather than two. Since half the rotatable blade guides on each side of the slicing work area will rotate in an opposite direction than the other half due to the different direction of movement of half the band saw passes, a separate shaft must be provided on each side of the slicing work area for each direction of rotation of the rotatable blade guides if they are to be coupled together.

With the coupling arrangement provided by rods 56, the blade guides 44 on each shaft coupled thereby will rotate at the same speed. This arrangement results in a joint effort among all the rotatable blade guides 44 on each shaft in maintaining all of said blade guides rotating. This reduces the effect of the lateral component of the frictional force between blade guide and shaft, which is particularly large if one or more of the blade guides 44 stop rotating, and thus provides a substantially increased capability of lateral movement of the rotatable blade guides on each shaft.

This lateral movement is caused when it is desired to vary the distance between the slices effected by the instant machinery, and the means interconnecting the stationary blade guide assemblies mentioned hereinabove are manipulated. This results in lateral movement of the band saw blades, and the blades will pull their rotatable blade guides 44 along therewith to their new positions. Of course, the less friction between the blade guides and their shaft, the less chance of blade breakage during this lateral movement.

Figure 6:
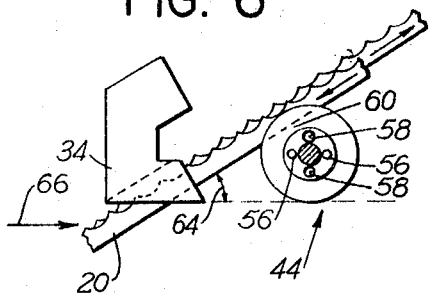
FIGURE 6 is a side elevation close-up view of a rotatable blade guide and a stationary blade guide.

With reference to FIG. 6, blades 20 pass through slot 45 in the blade guides 44 with a substantial clearance 60 between the bottom of the blade and the bottom of slot 45, the teeth 62 of the blades being normally above slot 45. This allows a margin for the flexing of the blades backward without the bottom of the blade hitting the bottom of the slot 45 in the rotatable blade guides 44 when a loaf of bread or oher articles to be sliced impinges on the blades and the blades move backward during slicing.

For optimum slicing capability the blades 20 are inclined at an angle 64 to the infeed direction of the loaves of bread, indicated by arrow 66. This angle is preferably 36°, but it should be understood the invention is not limited to an angle of 36°, a wide range of angles being operable.

It will be obvious to those skilled in the art that many changes can be made in the details of construction and arrangement of parts without departing from the scope of the invention as defined in the appended claims.

What is claimed is:

1. In a slicing machine having a plurality of band saws mounted on and driven by rollers, the band saws lying flat on the rollers, a blade guide apparatus which comprises:

stationary blade guides that are adjustable to provide different slice widths, a shaft, and rotatable blade guides mounted on the shaft for translating the attitude of a portion of the band saw blades such that they are substantially parallel to the direction items are advanced thereto for slicing, said rotatable blade guides being slidable along the shaft in response to adjustment of the stationary blade guides.

2. In a slicing machine having a plurality of band saws mounted on and driven by rollers, the band saws lying flat on the rollers, a blade guide apparatus which comprises:

a shaft, rotatable blade guides mounted on the shaft for translating the attitute of a portion of the band saw blades such that said portions of the blades are substantially perpendicular to the axes of said rollers, and means interconnecting the rotatable blade guides for assuring that they all rotate in unison.

3. A blade guide apparatus according to claim 1, further comprising:

means interconnecting the rotatable blade guides for assuring that they all rotate in unison.

4. A blade guide apparatus according to claim 1, further comprising:

means interconnecting the rotatable blade guides for enhancing the capability of said rotatable blade guides for lateral movement on the shaft in response to said adjustment of the stationary blade guides.

5. A blade guide apparatus according to claim 1, wherein:

there are two sets of stationary blade guides, one positioned on either side of the slicing work area, and there are two shafts having the means rotatably mounted thereon, each shaft being spaced from a set of stationary wave guides.

6. A blade guide apparatus according to claim 1, wherein:

there are two stationary blade guides for each blade, one positioned on either side of the slicing work area, and there are two shafts having the means rotatably mounted thereon, each shaft being spaced from the stationary blade guides on one side of the slicing work area.

7. In a bread slicing machine, in combination:
a plurality of band saw type blades mounted on a set of drive rollers,
a stationary blade guide assembly for each of the passes of the plurality of band saw blades, each of said stationary blade guide assemblies comprising two spaced members, one on each side of the slicing work area, and
means for translating the attitude of the band saw blades such that the cutting edges thereof are substantially parallel to the infeed direction of loaves of bread, which means includes:
a pair of shafts, each mounted on the machine spaced from a drive roller, and
means mounted on each shaft for engaging each band saw blade.

8. A bread slicing machine according to claim 7, wherein:
said means for engaging each band saw blade comprises a blade guide rotatably mounted on each shaft in spaced relationship with each member of the stationary blade guide assembly, said rotatably mounted blade guide having an annular recess in its periphery for receiving a band saw blade.

9. A bread slicing machine according to claim 7, wherein:
the blades of the band saw are scalloped, and
the band saw blades pass through the annular recess of said rotatable blade guide with the scalloped portion thereof free of the recess.

10. A bread slicing machine according to claim 7, wherein:
said rotatable blade guides have a hub portion, and the band saw blades pass through said annular recess in said members with a clearance between the bottom of the blade and said hub.

11. In a bread slicing machine, in combination:
a plurality of band saw type blades mounted on two sets of rollers,
a stationary blade guide assembly for each of the passes of the plurality of band saw blades, each of said stationary blade guide assemblies comprising two spaced members, one on each side of the slicing work area, and
means for translating the attitude of the band saw blades such that the cutting edges thereof are substantially parallel to the infeed direction of loaves of bread, which means includes:
two pairs of shafts, each pair being mounted on the machine between a set of stationary blade guide members and a set of rollers, and
a plurality of blade guides rotatably and slidably mounted on each shaft, each of said rotatable blade guides have an annular recess in the periphery thereof for receiving a band saw blade,
the blade guides, shafts and band saw blades being arranged such that each band saw blade is received in the recesses of two spaced rotatable blade guides, each of said rotatable blade guides being mounted on one shaft of each of said pairs of shafts, while adjacent band saw blades are received in the recesses of spaced rotatable blade guides mounted on the other shafts of each of said pairs of shafts.

12. A bread slicing machine according to claim 11, wherein:
each band saw is a continuous band and provides two band saw blades passes through the slicing work area, and
the two passes of each band saw are adjacent on the slicing work area.

References Cited

UNITED STATES PATENTS

| 2,032,118 | 2/1936 | Criner | 82—201.12 X |
| 2,254,524 | 9/1941 | Hartman | 83—201.1 |
| 3,003,531 | 10/1961 | Niebuhr | 83—201.1 |
| 3,145,745 | 8/1964 | Benith | 83—201.1 |
| 3,198,050 | 8/1965 | Benith | 83—201.13 X |

FOREIGN PATENTS 66,301 12/1892 Germany.

W. S. LAWSON, Primary Examiner

U.S. Cl. X.R.

83—201.12, 201.13, 201.15